United States Patent [19]
Nakai et al.

[11] Patent Number: 5,506,370
[45] Date of Patent: Apr. 9, 1996

[54] DISPLAY CONTROLLING APPARATUS FOR MUSIC ACCOMPANIMENT PLAYING SYSTEM, AND THE MUSIC ACCOMPANIMENT PLAYING SYSTEM

[75] Inventors: Toshiki Nakai; Mitsuyoshi Amano; Kazuhiro Miyamoto; Yoshiyuki Akiba; Masuhiro Sato, all of Tokyo, Japan

[73] Assignee: Pioneer Electronic Corporation, Tokyo, Japan

[21] Appl. No.: 305,432

[22] Filed: Sep. 13, 1994

[30] Foreign Application Priority Data

Sep. 13, 1993  [JP]  Japan .................................... 5-227594

[51] Int. Cl.⁶ ............................ G09B 15/04; G10H 1/38; H04N 5/76
[52] U.S. Cl. ........................... 84/637; 84/645; 84/477 R; 84/DIG. 22; 348/484; 358/342
[58] Field of Search ..................... 84/601, 602, 609–614, 84/634–638, 645, 477 R, 478, DIG. 22; 358/335, 342; 348/484, 738

[56] References Cited

U.S. PATENT DOCUMENTS

5,335,073  8/1994  Yamamoto ........................... 84/601 X

*Primary Examiner*—Stanley J. Witkowski
*Attorney, Agent, or Firm*—Young & Thompson

[57] ABSTRACT

In a music accompaniment playing system, MIDI (Music Instrument Digital Interface) sound source controlling data to control a MIDI sound source for generating accompaniment music information for music accompaniment playing, and display controlling data to perform a display corresponding to the MIDI sound source Controlling data, are reproduced from a record medium for music accompaniment playing. The display controlling data includes lyrics data corresponding to lyrics for music accompaniment playing, and accompaniment chord data corresponding to an accompaniment chord of the accompaniment music information. A display controlling apparatus for the music accompaniment playing system is provided with: a reading device for reading the display controlling data from the record medium; and an accompaniment chord display controlling device for generating data to display the lyrics on a display having a picture plane and to display the accompaniment chord on the picture plane at a vicinity of the displayed lyrics corresponding to the accompaniment chord, on the basis of the accompaniment chord data in the display controlling data read by the reading device.

11 Claims, 12 Drawing Sheets

LYRICS TRACK PORTION 22

| BYTE | DATA | |
|---|---|---|
| 1 | Status Byte | ⎫ |
| 2~5 | Track Length | ⎪ |
| 6 | Telop Direction | ⎬ 25 |
| 7~12 | Kind of Language | ⎪ |
| 13 | Status Byte | ⎪ |
| 14~16 | Lyrics Display Color | ⎪ |
| 17 | Status Byte | ⎪ |
| 18~20 | Lyrics Scrool Color | ⎭ |
| 21~m | Lyrics Timing Data | } 26 |
| m+1~ m+2 | Track End Data | } 27 |

FIG. 4

| B | R | G | COLOR |
|---|---|---|-------|
| 0 | 0 | 0 | BLACK |
| 0 | A | A | OCHER YELLOW |
| 0 | A | F | YELLOWISH GREEN |
| A | 0 | F | FRESH GRASS |
| A | A | A | GRAY |
| A | A | F | BROWNISH GREEN |
| A | F | A | PINK |
| F | 0 | F | LIGHT BLUE |
| F | A | 0 | BLUISH PURPLE |
| F | F | 0 | PURPLE |
| F | F | F | WHITE |

FIG. 5

| DATA NAME | DATA STRUCTURE |
|---|---|
| LYRICS TELOP DISPLAY TIMING DATA | STATUS=DFh<br>DATA = [Display Timing] :1Byte |
| SCROLL LYRICS DATA | STATUS=C0h<br>DATA = [Scrool Start Timing]<br>　　　　[Scrool Speed]<br>　　　　[Lyrics Data] :2Byte+nByte |
| RUBY DATA | STATUS=D1h<br>DATA = [Lyrics Data]<br>STATUS=D2h<br>DATA = [Ruby Data]<br>STATUS=D3h |
| ACCOMPANIMENT CHORD DATA | STATUS=D4h<br>DATA = [Chord Data] :nByte<br>STATUS=D5h |
| LYRICS TELOP DISPLAY ENDING DATA | STATUS=D0h<br>DATA = [Timing] :1Byte |
| LYRICS DISPLAY COLOR DATA | STATUS=A0h<br>DATA = [Display Color] :3Byte |
| SCROLL COLOR DATA | STATUS=B0h<br>DATA = [Scrool Color] :3Byte |

FIG. 6

| Key | Data |
|---|---|
| C | %0 (25h, 30h) |
| Db | %1 (25h, 31h) |
| D | %2 (25h, 32h) |
| Eb | %3 (25h, 33h) |
| E | %4 (25h, 34h) |
| F | %5 (25h, 35h) |
| Gb | %6 (25h, 36h) |
| G | %7 (25h, 37h) |
| Ab | %8 (25h, 38h) |
| A | %9 (25h, 39h) |
| Bb | %: (25h, 3Ah) |
| B | %: (25h, 3Bh) |

FIG. 7

CHORD NAME
- C → D4 25 30 D5
  $$\frac{\%\ 1}{C}$$

- C7 → D4 25 30 37 D5
  $$\frac{\%\ 1}{C\quad 7}$$

- Cm7 → D4 25 30 6D 37 D5
  $$\frac{\%\ 1}{C\quad m\quad 7}$$

- CmonD → D4 25 30 6D 20 6F 6E 25 32 D5
  $$\frac{\%\ 1}{C\quad m\ [sp]\ o\quad n}\quad \frac{\%\ 2}{C}$$

(NO KEY CONTROL)

| CHORD CHARACTER | Gb | G | Ab | A | Bb | B | C | Db | D | Eb | E | F |
|---|---|---|---|---|---|---|---|---|---|---|---|---|
| RESULT OF CALCULATION | 6 | 7 | 8 | 9 | 10 | 11 | 0 | 1 | 2 | 3 | 4 | 5 |

FIG. 13

(KEY CONTROL ; +3)

DISPLAY CONTROLLING APPARATUS FOR MUSIC ACCOMPANIMENT PLAYING SYSTEM, AND THE MUSIC ACCOMPANIMENT PLAYING SYSTEM

BACKGROUND OF THE INVENTION

1. Field of the Invention

The present invention generally relates to a display controlling apparatus, and more particularly to a display controlling apparatus used for a music accompaniment playing system (i.e. so-called karaoke system) which gives a music performance by use of record data including MIDI (Music Instrument Digital Interface) standard, and such a music accompaniment playing system.

2. Description of the Related Art

There are some types of music accompaniment playing systems. Two examples are explained here.

Firstly, there is a so-called LVD (Laser Video Disc) music accompaniment playing system. The LVD music accompaniment playing apparatus is provided with: a LVD autochanger for storing and reproducing a plurality of laser video discs, which are the information recording media for music accompaniment playing information; a commander for controlling the LVD autochanger and selecting a laser video disc out of the discs stored in the LVD autochanger depending on the request inputted from an operation unit; an amplifier and speakers for outputting the reproduced audio signal as audio sound; an image displaying apparatus for displaying the reproduced image signal as an image; a microphone for converting a sound voice in singing, to audio signal and outputting it to the amplifier. The amplifier mixes the audio signal, as the so-called music accompaniment playing music, from the LVD autochanger with the audio signal of singing sound voice from the microphone, and outputs it to the speakers. The commander may include the operation unit.

Secondly, there is a CD (Compact Disc) music accompaniment playing system. The CD music accompaniment playing system is provided with: a CD autochanger for storing a plurality of compact discs as media for music accompaniment playing information, and reproducing it; a commander for controlling the CD autochanger and selecting one compact disc out of the discs stored in the CD autochanger depending on the request inputted from the operation unit; an amplifier and speakers for outputting the reproduced audio signal as the audio sound; a graphic decoder for converting the graphic data, which is reproduced from the sub-code data in the compact disc, to an image signal; an image displaying apparatus for displaying the image signal as an image; a microphone for converting the sound voice in singing to an audio signal and outputting it to the amplifier. The amplifier mixes the audio signal, which is the so-called music accompaniment playing music, from the CD autochanger, and the audio signal of the singing sound voice from the microphone, and output it to the speakers. The commander may include the operation unit and the graphic decoder.

According to the above constructions, it becomes possible to sing a song with the music accompaniment playing music (i.e. karaoke music) as the accompaniment music, and at the same time, the image can be appreciated.

However, in the above mentioned music accompaniment playing systems, only the lyrics and the ruby characters of character portions of the lyrics, are displayed on an image picture plane of the displaying apparatus such as a monitor. For example, even if an instrument is to be played during the performance of music accompaniment playing, since the accompaniment chord is not displayed, the performer or player, who does not know the accompaniment chord, cannot perform.

SUMMARY OF THE INVENTION

It is therefore an object of the present invention to provide a display controlling apparatus for a music accompaniment playing system, and the music accompaniment playing system, which can display an accompaniment chord corresponding to the music information for the music accompaniment playing music information.

The above object of the present invention can be achieved by a first display controlling apparatus for a music accompaniment playing system, in which MIDI (Music Instrument Digital Interface) sound source controlling data to control a MIDI sound source for generating accompaniment music information for music accompaniment playing, and display controlling data to perform a display corresponding to the MIDI sound source controlling data, are reproduced from a record medium for music accompaniment playing. The display controlling data includes lyrics data corresponding to lyrics for music accompaniment playing, and accompaniment chord data corresponding to an accompaniment chord of the accompaniment music information. The first apparatus is provided with: a reading device for reading the display controlling data from the record medium; and an accompaniment chord display controlling device for generating data to display the lyrics on a display having a picture plane and to display the accompaniment chord on the picture plane at a vicinity of the displayed lyrics corresponding to the accompaniment chord, on the basis of the accompaniment chord data in the display controlling data read by the reading device.

According to the first apparatus of the present invention, since the accompaniment chord is displayed at the vicinity of the corresponding lyrics on the picture plane on the basis of the accompaniment chord data, by virtue of the accompaniment chord display controlling device, the music player can easily play the instrument in parallel with the reproduction of the accompaniment music of music accompaniment playing.

The above object of the present invention can be also achieved by a second display controlling apparatus, which is constructed by adding a following feature to the above described first apparatus of the present invention. Namely, a sound key changing data to change a sound key of the accompaniment music information is inputted to the music accompaniment playing system from the external, and the accompaniment chord display controlling device is provided with an accompaniment chord changing device for changing the accompaniment chord data to another accompaniment chord data corresponding to the changed sound key on the basis of the sound key changing data.

According to the second apparatus of the present invention, since the accompaniment chord data is changed to another accompaniment chord data corresponding to the changed sound key on the basis of the sound key changing data, by virtue of the accompaniment chord changing device, the accompaniment chord displayed on the picture plane corresponds to the accompaniment music after the key change (transposition).

The above object of the present invention can be also achieved by a music accompaniment playing system provided with: a record medium for recording MIDI (Music Instrument Digital Interface) sound source controlling data to control a MIDI sound source for generating accompaniment music information for music accompaniment playing, and display controlling data to perform a display corresponding to the MIDI sound source controlling data, the display controlling data including lyrics data corresponding to lyrics for music accompaniment playing, and accompaniment chord data corresponding to an accompaniment chord of the accompaniment music information; a reproducing device for reproducing the MIDI sound source controlling data and the display controlling data from the record medium; and an accompaniment chord display controlling device for generating data to display the lyrics on a display having a picture plane and to display the accompaniment chord on the picture plane at a vicinity of the displayed lyrics corresponding to the accompaniment chord, on the basis of the accompaniment chord data in the display controlling data reproduced by the reproducing device.

According to the system of the present invention, since the accompaniment chord is displayed at the vicinity of the corresponding lyrics on the picture plane in the same manner as the above described first apparatus of the present invention, the music player can easily play the instrument in parallel with the reproduction of the accompaniment music of music accompaniment playing.

The nature, utility, and further features of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Referring to the accompanying drawings, an embodiment of the present invention will be now explained.

First of all, prior to the explanation of the embodiments, the MIDI standard which is used in the present embodiment, is explained.

The MIDI (Musical Instrument Digital Interface) standard is a standard determined to enable an exchange of the information by connecting instruments such as a synthesizer and an electric piano with each other. In the following explanations, an electrical instrument, which is provided with a hardware to process information of this MIDI standard and which has a function to transmit and receive a MIDI controlling signal i.e. an instrument performance controlling signal, is defined as a MIDI apparatus. The MIDI apparatus gives a performance along with an instrument performance program which is formed by the MIDI signal obtained by converting the successively supplied MIDI formatted signals to serial signals.

By the way, a sub code is recorded on a disc such as a CD (Compact Disc), a CD-V (CD - Video), a LVD (Laser Vision Disc) including a CD formatted digital sound voice etc., and a tape such as a DAT (Digital Audio Tape). The sub code consists of P, Q, R, S, T, U, V and W channels. Among those channels, the P and Q channels are used for the purpose of controlling and timing of the disc player, and displaying.

On the other hand, the R to W channels are empty channels which are the so-called user's bits, which may be used for the graphic, the audio voice, the image etc.

The MIDI formatted signal which is based on the MIDI standard, can be recorded to this user's bits, and the standard corresponding to this may be formed.

In this case, it is possible to not only listen to and watch the program recorded on the disc by supplying the audio video signal reproduced by the disc player to the AV system, but also supply the performance program information to the MIDI apparatus provided in the AV system or another MIDI apparatus. Thus, various applications may be applied to it, such as a construction of the AV system with the electric instrument etc. which has a concert hall presence, and a construction of the educational software.

The MIDI formatted signal which is supplied to the MIDI apparatus, is a serial data with the transmission rate of 31.25 [Kbaud], and constructs 1 byte data by total 10 bits of the 8 bits data, 1 start bit and 1 stop bit.

In order to specify the kind of date to be transmitted and the MIDI channel, at least one status byte and one or two data bytes which is guided by the status, are combined to form the message which are the music information. Thus, one message consists of 1 to 3 bytes, and the transmission time of 320 to 960 [μsec] is required to transmit the message. An instrument performance program is constituted by one series of message.

FIRST EMBODIMENT

Nextly, the MIDI music accompaniment playing apparatus as a first embodiment, will be explained with referring to FIG. 1.

Figure 1:
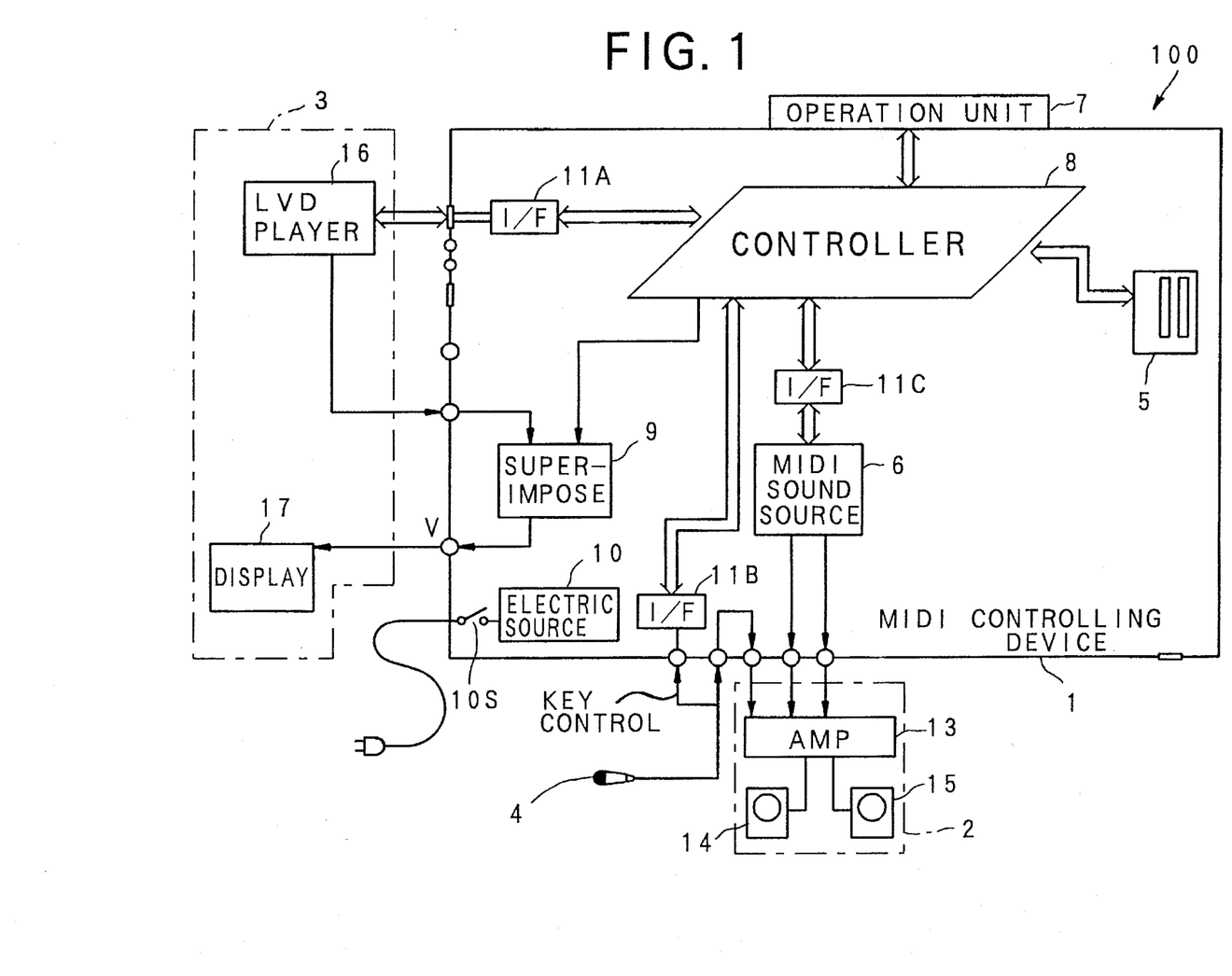
FIG. 1 is a block diagram of a MIDI music accompaniment playing apparatus as a first embodiment of the present invention.

In FIG. 1, a MIDI music accompaniment playing apparatus 100 is provided with: a MIDI controlling device 1 for controlling the apparatus 100 on the whole, and outputting the music accompaniment playing sound voice signal by use of a build-in type MIDI sound source module 6; an audio sound outputting system 2 for amplifying and outputting the music accompaniment playing sound voice signal; an image display system 3 for displaying a background video image and lyrics; a microphone 4 having a key control switch for outputting a key control signal to change a key (sound tone).

The MIDI controlling device 1 is provided with: an OMDD (Optical Memory Disc Drive) 5 for reading or reproducing information by use of an OMD (Optical Memory Disc) which is the music accompaniment playing information record medium; the MIDI sound source module 6; an operation unit 7 for performing the input of various operation instruction data; a controller 8 for performing a key control on the basis of the key control signal; a superimpose circuit 9 for superimposing a lyrics display on the video image signal; an electric source 10 for supplying an electric source to the whole apparatus; an electric source switch 108 for performing ON/OFF of the supply of the electric source 10; an interface portion 11A for performing an interface operation between a LVD (Laser Video Disc) player 16 in the image display system 3, and a controller 8; an interface portion 11B for performing an interface operation between the microphone 4 and the controller 8; an interface portion 11C for performing an interface operation between the MIDI sound source module 6 and the controller 8.

The audio sound outputting system 2 is provided with: an amplifier 13 for amplifying the music accompaniment playing sound voice signal; and speakers 14 and 15 for converting the electric signal to the audio sound.

The image display system 3 is provided with: the LVD player 16 for reproducing the LVD; and a display device 17 for performing the display of background video image and the lyrics for the singer.

Nextly, an example of the recording medium for the music accompaniment playing information by the MIDI is explained, with referring to FIG. 2 to FIG. 5.

Figure 2:
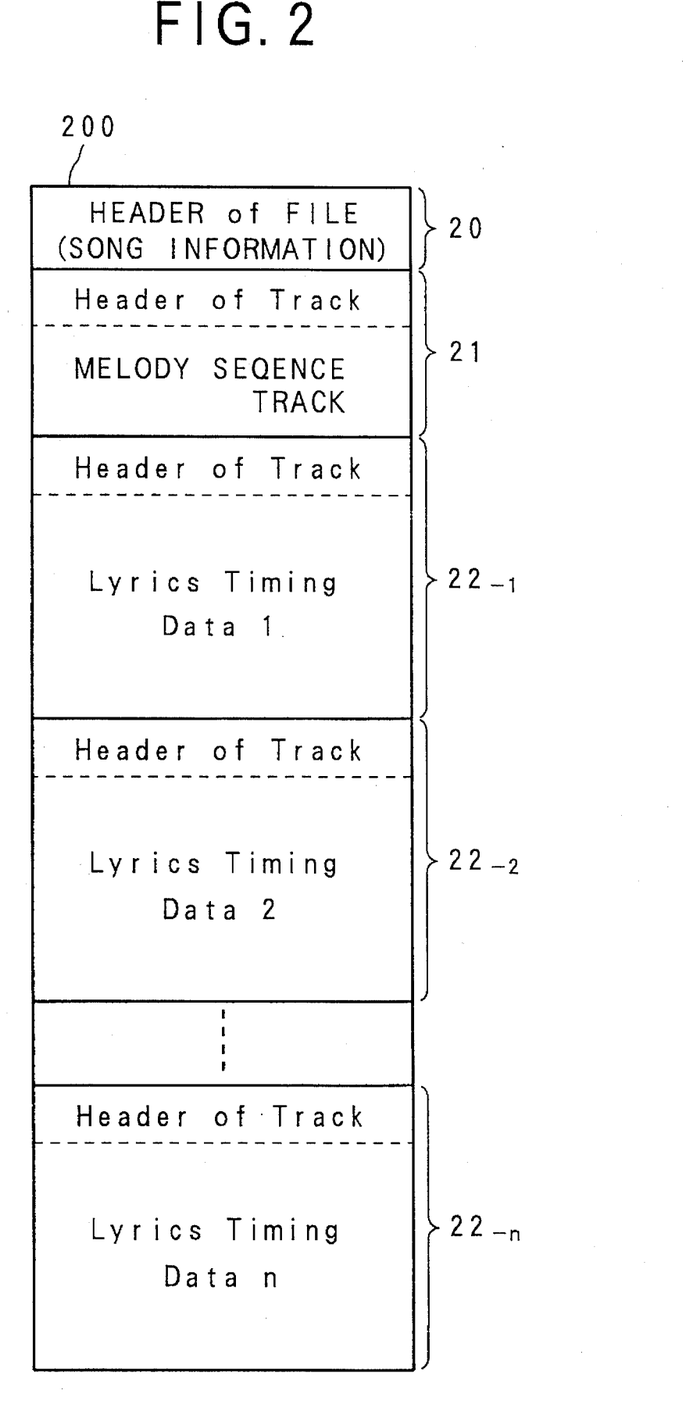
FIG. 2 is a diagram showing a construction of a lyrics file included in the MIDI music accompaniment playing file in the embodiment.

FIG. 2 shows the data structure of the lyrics file 200 included in the MIDI music accompaniment playing file, which is stored in the OMD as the recording medium for the music accompaniment playing information. The OMD is an optical disc which is writable and is used as a memory.

This lyrics file 200 is, as shown in FIG. 2, provided with a file header portion 20 to which a music title, a singer name, a musical composer name, a lyrics writer, an arranger name, a total performance time, etc. are recorded; a melody sequence track portion 21, to which intro-sequence data is stored to give a performance of the introduction portion (so-called intro-portion) of the recorded music program; and one or a plurality n of lyrics track portions 22-1, 22-2 ..., 22-n, to which the actual lyrics data etc. are recorded. The lyrics track portions 22-2 to 22-n are used only in the case that there exist lyrics data according to the parody song or other languages (e.g. English with respect to Japanese) with respect to the lyrics data recorded on the lyrics track portion 22-1, while it is not recorded if such data is not used.

In the explanations below, the lyrics track portion particularly related with the present embodiment is explained in detail.

Figure 3:
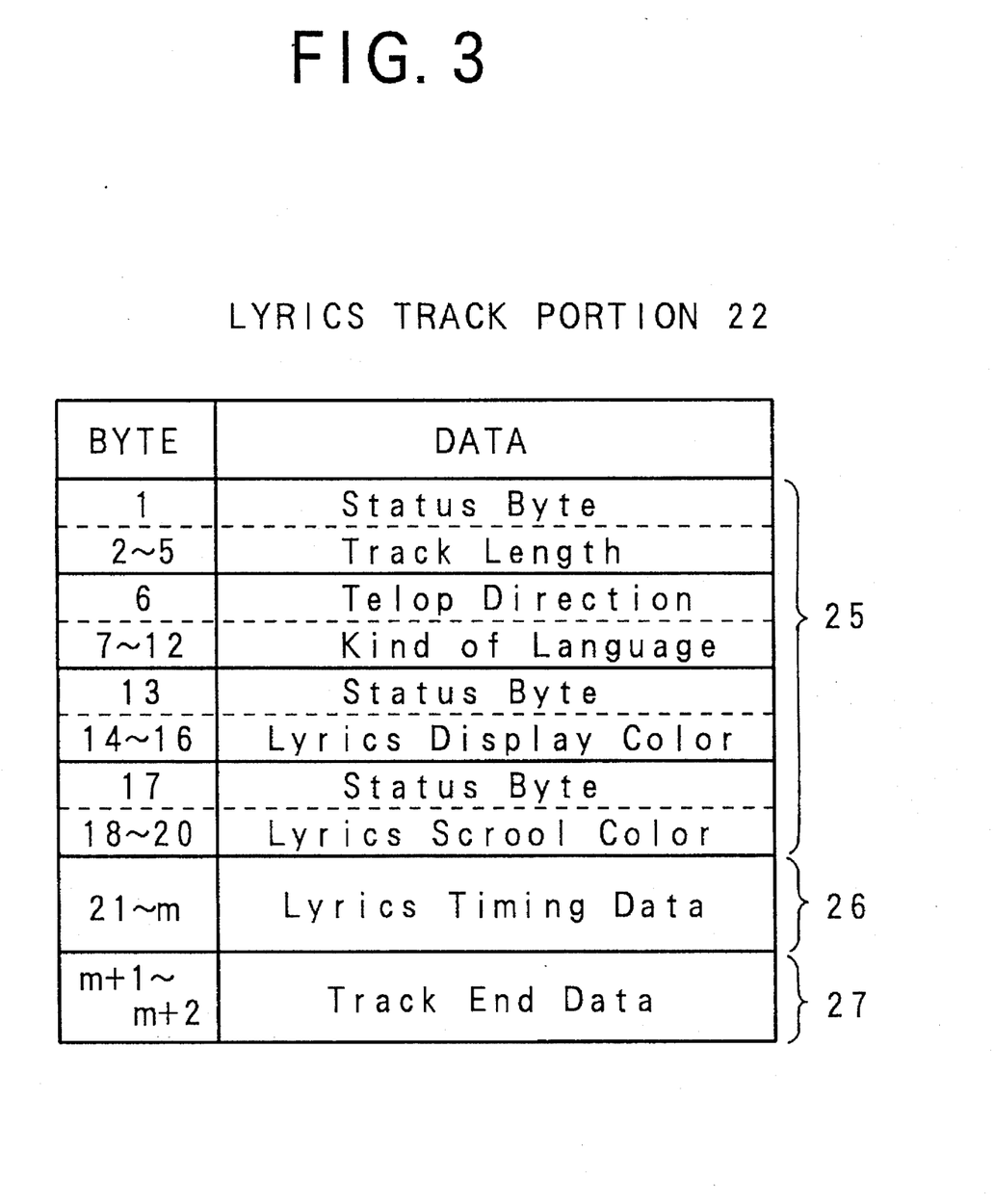
FIG. 3 is a diagram showing a construction of the lyrics track portion of the file in the embodiment.

In FIG. 3, the lyric track portion 22 is provided with: a track header portion 25 to which various control information is recorded; a lyrics timing data portion 36 to which the actual lyrics data etc. is recorded; and a track end data portion 27 showing the end of the lyrics track.

The track header portion 25 consists of 20 bytes for example, and specifies the track length, the lyrics telop scroll direction, the kind of the language to be used, the color of the lyrics telop display and the color of the lyrios telop scroll. Here, the color of the lyrics telop display or the color of the lyrics telop scroll may be omitted.

At the 1st byte (i.e. status byte) of the track header portion 25, the data="FFh" (Here, h indicates that it is sexadecimal (16) data, hereinafter) which indicates the start position of the track header portion 25, are recorded, and the track length of the lyrics track is recorded as the byte number on the next 2nd to 5th bytes.

At the 6th byte of the track header portion 25, the control data in the direction of the lyrics telop scroll (i.e. the telop direction data), is recorded. For example, if "01b" is recorded, the scroll of the lyrics telop is performed from the left to the right on the display picture plane. If "02h" is recorded, the scroll of the lyrics telop ie performed from the right to the left on the display picture plane. If "03h" is recorded, the scroll of the lyrics telop is performed from the upper to the lower on the display picture plane. In this case, the "scroll" means to partially change the color of the character displayed by the first color, and finally change it to the second color, so that it allows a singer to sing well just by following the portion of the characters where the color is changing.

On the 7th to 12th bytes of the track header portion 25, the type of the used language is recorded by the ACSII code by 6 characters amount.

If "A0h" is recorded at the 13th byte of the track header portion 25, the lyrics telop display color is specified to the next 14th to 16th bytes.

If "A0h" is recorded at the 13th byte of the track header portion 25, the B (Blue), R (Red), G (Green) are specified to the 14th byte, 15th byte and 16th byte respectively. The specification of each color of B, R, G is performed by use of the value between "00" to "0Fh".

Figure 4:
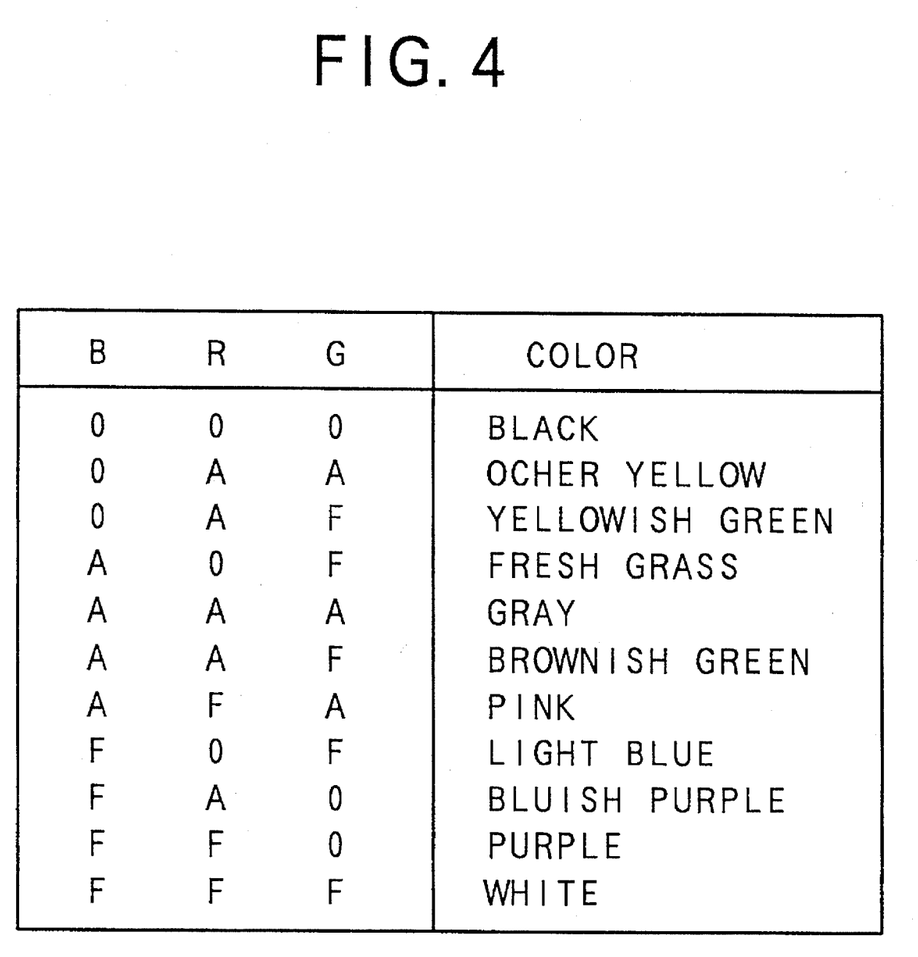
FIG. 4 is a diagram for explaining setting of the lyrics display color data in the embodiment.

As a more concrete specification, for example, as shown in FIG. 4, if the pink display is to be performed, the value of "0Ah" is recorded at the 14th byte, the value of "0Fh" is recorded at the 15th byte, and the value of "0Ah" is recorded at the 16th byte.

In FIG. 3, again, if "B0h" is recorded on the 17th byte of the track header portion 25, the lyrics telop scroll color is specified to the 18th to 20th bytes.

If "B0h" is recorded at the 17th byte of the track header portion 25, B (Blue), R (Red) and G (Green) are specified respectively to the 18th byte, 19th byte and 20th byte. The specification of each color of B, R, G is the same as the aforementioned case of the display color of the lyrics telop.

The lyrics timing data portion 26 is recorded in the region following the track header portion 25. In the above mentioned case, it is recorded at the 21th byte to mth byte (m is a value varied according to the length of the lyrics line).

In the lyrics timing data portion 26, the lyrics telop display timing data, the scroll lyrics data, ruby data, accompaniment chord data, the lyrics telop display end data, the timing status data, the lyrics display color data, the scroll color data etc. are recorded.

Figure 5:
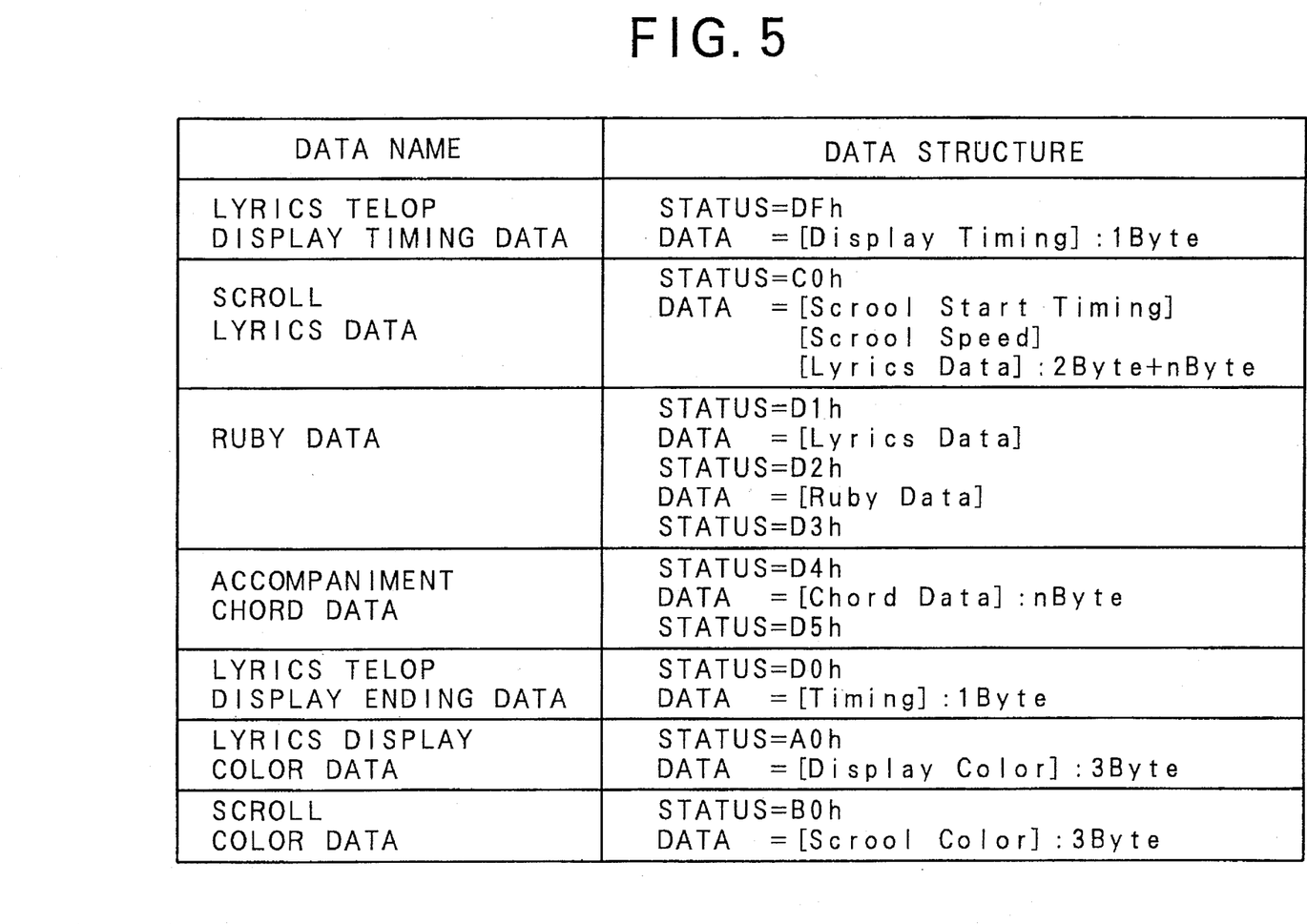
FIG. 5 is a diagram for explaining data constructions of various data in the embodiment.

Here, each of the above mentioned data is explained in detail, with referring to the data construction explanation view of FIG. 5.

The status data of the lyrics telop display timing data is "DFh". The lyrics corresponding to the lyrics data until the following lyrics telop display end data, is displayed at the display timing recorded in the data region of 1 following the status data.

The displaying timing is expressed by the step number from the timing status data (="FDh"). Here, the interval of this timing status data corresponds to the length of four pieces of quarter note.

In the scroll lyrics data, the status data is "C0h", the 1 byte following the status data is the region for the scroll start timing data, the next 1 byte is the region for the scroll speed data, and the further next n bytes are the region for the lyrics data.

The scroll start timing data starts the scroll at the timing when it has passed after the timing status data, the time period obtained by multiplying the value of the scroll start timing data with a value, which is obtained by dividing the performance time period corresponding to the quarter note by 24.

The scroll speed data scrolls one character at a speed corresponding to the value obtained by multiplying the value of the scroll speed data with a value, which is obtained by dividing the performance time period corresponding to the quarter note by 24.

The lyrics data is character data which is displayed by JIS (Japanese Industrial Standard) code to be scrolled.

The ruby data gives ruby characters corresponding to the ruby data, which status data are recorded between "D2h" to "D3h", onto the characters corresponding to the lyrics data which status data are recorded between "D1h" to "D2h".

Figure 6:
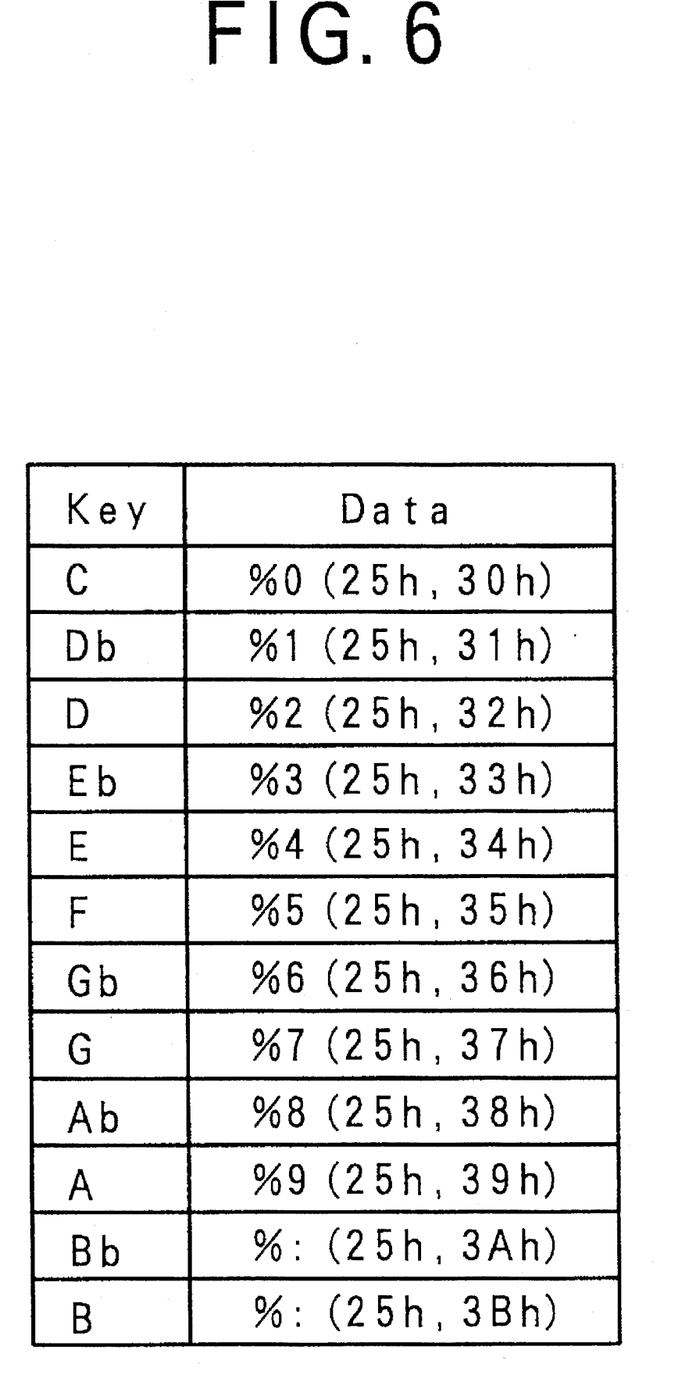
FIG. 6 is a diagram for explaining accompaniment chord data in the embodiment.
Figure 7:
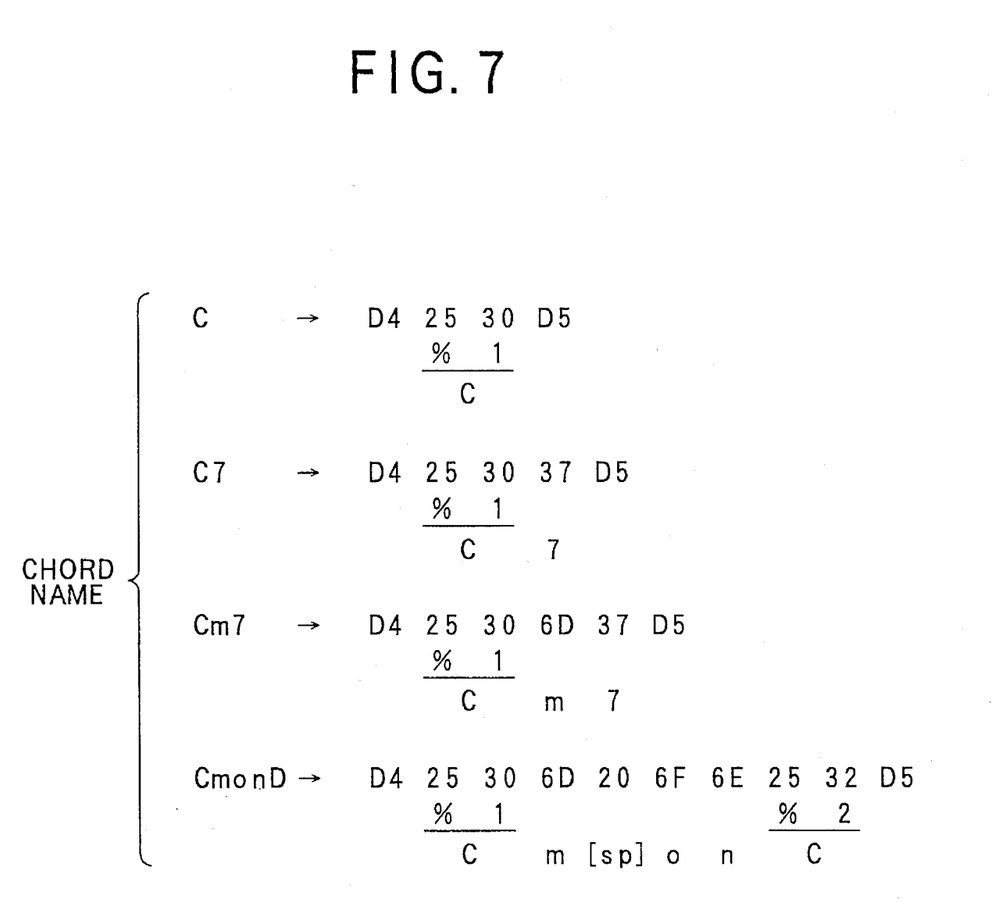
FIG. 7 is a diagram for explaining the accompaniment chord data in the embodiment.

In the accompaniment chord data, the status data is "D4h", and the data corresponding to the actual accompaniment chord is recorded at its n bytes region following the status data, and the status data "D5h" to indicate the end of he accompaniment chord is recorded at its 1 byte following Here, the format of the accompaniment chord data is explained in more detail with referring to FIG. 6 and FIG. 7.

A character code is assigned to a portion to express the name of the sound key (indication of a root sound and a base sound etc.) in the chord name of the accompaniment chord. More conerarely, the character data, which have the continuous character code number to which "%" is added as the first character are assigned, such that the character code (25*h*, 30*h*) ="% 0" in case of expressing the sound key "C", and the character code (25*h*, 31*h*)="% 1" in case of expressing the sound key "Db (D flat)", . . . , as shown in FIG. 6.

The actual chord name is basically expressed by (root sound+constitutional sound structure). For example, with respect to the root sound "C", there are chord names such as a chord "C" (major triad: since it is a basic chord construction, the expression thereof is simplified. In a not simplified form, it is expressed by "CM"), "Cm" (minor triad), "CM7" (major 7th), "Cm 7 (flat 13)" (minor 7th flat 13th, tension chord), "Cm/E" (minor on E, on base chord), "CM/Dm7" (C major on D minor 7th, upper structure triad), and so on (wherein the underlined portion is the sound key).

In case of expressing this kind of chord, the portion other than the sound key displaying portion, is recorded by ASCII code, as shown in FIG. 7. More concretely, in case that "Cm 7" is expressed, "C"=(25*h*, 30*h*)="% 0" indicating the sound key is recorded to the 2 bytes following the status data ="D4h" indicating the record starting position of the accompaniment chord data, the ASCII code="6Dh" corresponding to the character data "m" is recorded to the next one byte, ACSII code="37" corresponding to the character data "7" is recorded to the further next 1 byte, and the status data= "D5h" indicating the record ending position of the accompaniment chord data is recorded to the final byte.

The lyrics telop display ending data, which status data is "D0h", erases the telop from the picture plane, at the display end timing recorded in the data area of one byte following the status data.

The display end timing is expressed by the step number from the timing status data (="FDh").

The lyrics display color data, which status data is "A0h", sets the display color of the lyrics by 3 bytes following the status data. The data format is the same as the lyrics display color data at the track header portion of FIG. 4. In the lyrics timing data, it is recorded after the lyrics display ending data and before the scroll lyrics data. If this lyrics display color data is omitted, the previous lyrics display color data is used as it is.

The scroll color data, which status data is "B0h", sets the scroll color by 3 bytes following the status data. The data format is the same as the scroll color data at the track header portion of FIG. 4. In the lyrics timing data, if there is a change in the display color, it is recorded after the lyrics display color data and before the scroll lyrics data. If the scroll color data is omitted, the previous scroll color data As used as it is.

The track end data portion is recorded at the 2 bytes following the lyrics data portion (the (m+1)th byte, and the (m+2)th byte), and to which the predetermined end data (=FEh, FEh) are recorded.

Nextly, the display controlling operation will be explained with referring to the process flow chart of FIG. 8.

Firstly, the controller 8 reads the data, which are developed on the memory in the controller 8, from the OMDD 5 (step S1).

Then, it is judged whether the read data is the lyrics telop display timing status data (="DFh") or not. Namely, it is judged whether the display data is started or not (step S2).

If the read data is not the lyrics telop display timing status data (="DFh") i.e. NO at the step S2, since it is not the display data, the process corresponding to this data is performed and the data is read again (step S1).

If the read data is the lyrics telop display timing status data (="DFh") i.e. YES at the step S2, since the display data is recorded thereafter, the display controlling operation is started.

Firstly, the controller 8 reads the lyrics telop display timing data, the scroll start timing data and the scroll speed data, to check each timing (step S3).

Nextly, it reads the data again (step S4), and it is judged whether the read data is a status data of any one of those data or not (step S5).

If the read data is not the status data of any one of those data (NO at the step S5), the data is stored or held (step S6), and the next data is read (step S4).

If the read data is the status data (YES at the step S5), firstly, it is judged whether it is the status data= "D1h" or not i.e. whether the start of the character data to which the ruby should be added or not (step S7).

If the read data is the status data="D1h" (YES at the step S7), the character data is read to which the ruby should be added (step S8), and the next data is read again (step S4).

If the read data is not the status data="D1h" (NO at the step S7), it is further judged whether the status data read by the controller 8 is the status data="D2h" or not i.e. whether it is the end of the character data to which the ruby should be added and it is the start of the ruby data or not (step S9).

If the read data is the status data="D2h" (YES at the step S9), the character data corresponding to the ruby is read (step S10), and the next data ie read (step S4)

If the read data is not the status data="D2h" (NO at the step S9), the controller 8 further judges whether the read status data is the status data="D3h" or not i.e. whether it is the end of the character data corresponding to the ruby or not (step S11).

If the read data is the status data="D3h" (YES at the step S11), it is finished to read the character data corresponding the ruby, and it is started to read the ordinary character data (step S12) and the next data is read (step S4).

If the read data is not the status data="D3h" (NO at the step S11), the Controller 8 further judges whether the read status data is the status data=D4h" or not i.e. whether it is the start of the accompaniment chord data or not (step S13).

If the read data is the status data="D4h" (YES at the step S13), it is started to read the character data corresponding to the accompaniment chord data (step S14), and the next data is read (step S4).

If the read data is not the status data="D4h" (NO at the step S13), the controller 8 further judges whether the read status data is the status data="D5h" or not i.e. whether it is the end of the accompaniment chord data or not (step S15).

If the read data is the status data 32 "D5h" (YES at the step S15), it is ended to read the character data corresponding to the accompaniment chord data (step S16), end the next data is read (step S4).

If the read data is not the status data="D5h" (NO at the step S15), the controller 8 further judges whether the read status data is the status data="D0h" or not i.e. whether it is the end of the display data or not (step S17).

If the read data is the status data="D0h" (YES at the step S17), it is ended to control the display operation after displaying, scrolling and erasing at each timing, and the ordinary operation is started (step S18).

If the read data is not the status data="D0h" (NO at the step S17), since it does not correspond to the status data which is prescribed in advance, the error process is performed (step S19).

Figure 9:
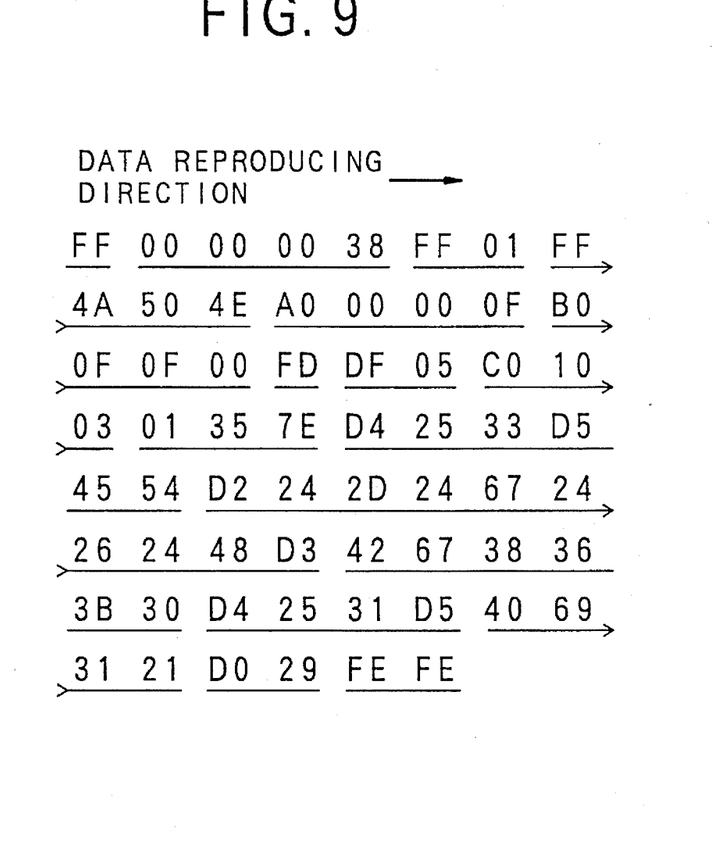
FIG. 9 is a diagram for explaining a concrete example of data in the lyrics track portion in the embodiment.

FIG. 9 shows an concrete example of data in the lyrics track portion.

Figure 8:
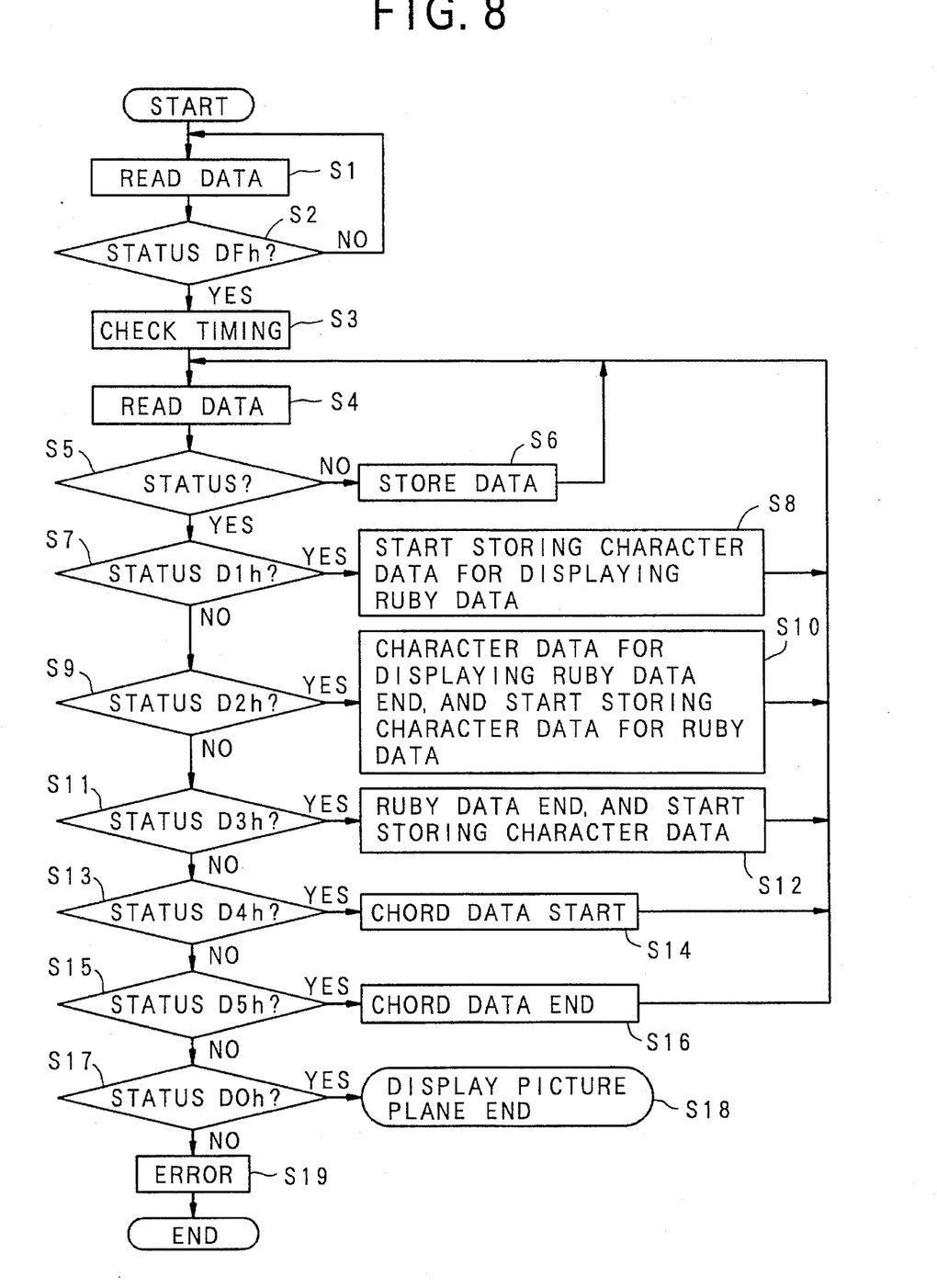
FIG. 8 is a flowchart showing a processing operation of the data in the lyrics track portion in the embodiment.

The result of analysis is shown below, in the case where the concrete data shown in FIG. 9 is processed by the above mentioned display controlling process flow chart (FIG. 8).

| | Result of Analysis |
|---|---|
| FF | start of the track header portion |
| 00 00 00 38 | track length "38h" = 56 bytes |
| FF 01 | display the telop from the left to the right |
| FF 44 50 4E | kind of language "JPN" = Japanese |
| A0 00 00 0F | character display color = green |
| B0 0F 0F 00 | scroll color = purple |
| FD | timing status data = timing at every 4 pieces of quarter note |
| DF 05 | lyrics telop display timing data = timing of 5/24 after the timing status data |
| C0 10 03 | scroll lyrics data = start scrolling at a timing of 10/24 after the timing status data, and scroll at a timing of 3/24 per one character |
| D1 35 7E | ruby data (lyrics data to which the ruby should be added) = "京" (Chinese character) |
| D4 25 33 D5 | accompaniment chord data = "E flat", display it at the upper chord area of the previous lyrics data (= "京") |
| 45 54 | ruby data (lyrics data to which the ruby should be added) = "都" |
| D2 24 2D 24 67 24 26 24 48 D3 | ruby data (the ruby which should be added to the lyrics data) = きょうと(Japanese hiragana), display evenly it at the upper ruby area of the lyrics data (= "京都") |
| 42 67 38 36 | lyrics data = "大原" |
| 3B 30 | lyrics data = "三" |
| D4 25 31 D5 | accompaniment chord data = "D flat", display it at the upper chord area of the just previous lyrics data (= "三") |
| 40 69 31 21 | lyrics data = "千院" |
| D0 29 | erase at the timing of 29/24 after the lyrics telop display ending data = timing status data |
| FE FE | track and data portion |

Figure 10:
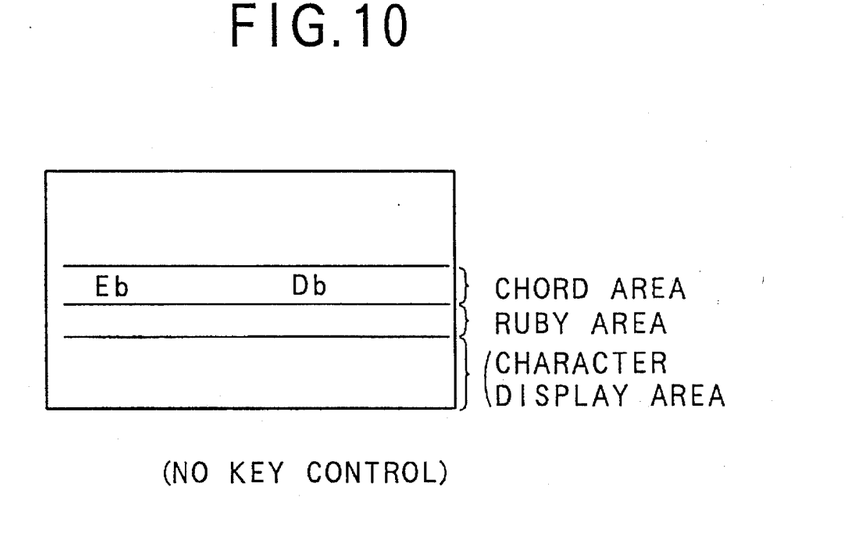
FIG. 10 is a diagram for explaining an example of the display in case there is no key control in the embodiment.

From the above data, the display is performed on the picture plane as shown in FIG. 10.

In this case, after starting the performance, the display of the lyrics is started at the timing when the time period corresponding to 5/24 pieces of the quarter note has passed after starting the performance, and the display color becomes green. Further, scrolling is started at the timing when the time period corresponding to 10/24 pieces of the quarter note has passed after that. Thus, the scrolling ie performed at the speed of 3/24 pieces of the quarter note per one character, and the scrolling color becomes purple.

However, the superimposed portion or area of these lyrics, rubies and chords which are superimposed on the original image, is set by the controlling program in advance, and the character size and the character style are determined by use of the character generator etc. In this case, the change in the character size etc., can be freely performed by changing the memory.

As described above, according to the first embodiment, it becomes possible to display the accompaniment chord corresponding to the lyrics at the chord area which is provided at the upper side of the character display area where the lyrics are displayed.

SECOND EMBODIMENT

Although the display operation has been explained as for the case where the key controlling operation is not performed in the first embodiment, the second embodiment is related to the display of the accompaniment chord in the case where the key controlling operation ie performed.

In general, in case of singing a song with the music accompaniment playing apparatus, the key controlling operation may be performed to change the sound tone (key) at the time of reproduction in accordance with the voice range of the singer.

By the way, the accompaniment chord data in the above mentioned first embodiment, is recorded in advance onto the OMD which is the recording medium. Thus, even if the key is changed, the accompaniment chord is not changed as it is. Instead, it is necessary for the player to transpose the instrument and perform the performance in the condition thereafter in case that the performances of the instruments are simultaneously played, resulting in the inconvenience.

Therefore, in the second embodiment, the accompaniment chord data is changed in accordance with the changed key, and the display of the accompaniment chord data corresponding to the actual performance key is performed.

Figure 11:
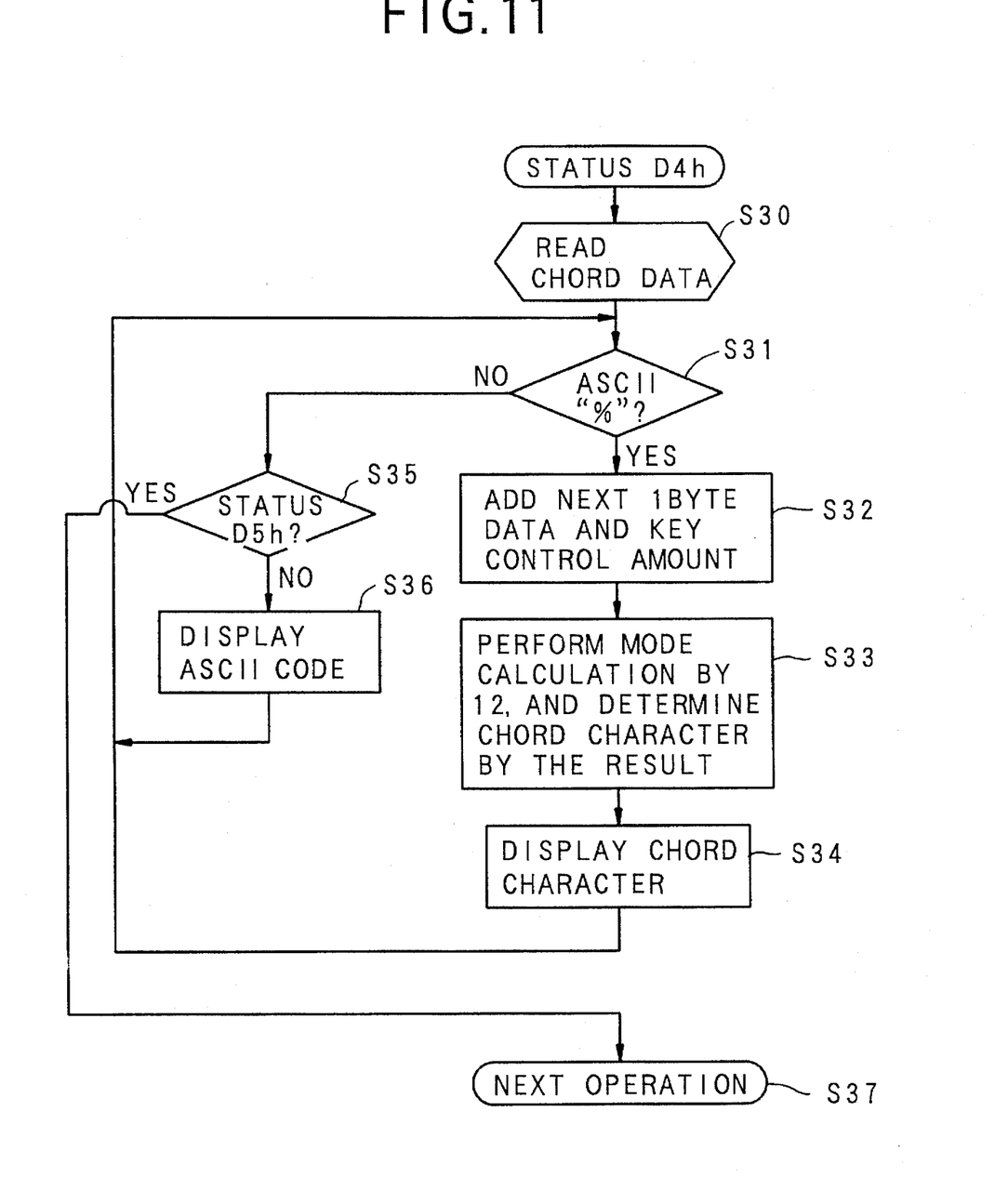
FIG. 11 is a flowchart showing an operation of displaying the accompaniment chord at the time of key control.

Nextly, a concrete changing process of the accompaniment chord, is explained with referring to the process flowchart of FIG. 11.

Firstly, the controller 8 starts reading character data corresponding to the accompaniment chord data if the read data is the status data="D4h" (step S30), and judges whether the 1st byte of the read data is "%" or not (step S31).

In this case, since the 1st byte of the accompaniment chord data is always "%", the flow goes to a step S32.

Nextly, the controller 8 add the next 1 byte data with the key control amount data (=−6, −5, . . . , +5, +6; as the value is varied by 1, the key is varied by halftone), which is inputted through the key controlling switch to output a key control signal to change the key (sound tone) provided in the microphone 4 (step S32).

More concretely, if the accompaniment chord data= "Cm7" and the key control data="+3" (=if shifting by one and half tone), the chord display of this accompaniment chord by the byte unit, becomes "25 30 6D 37", so that, since the 2nd byte is "30h", the added value ADD to be obtained by the step S32 becomes as following.

$$\begin{aligned}ADD &= 30h + 3 \\ &= 33h\end{aligned}$$

Nextly, a calculation (mode calculation) to obtain the surplus in the result of dividing by 12 (i.e. the number of the basic keys) is performed to determine the chord character (step S33).

Figure 12:
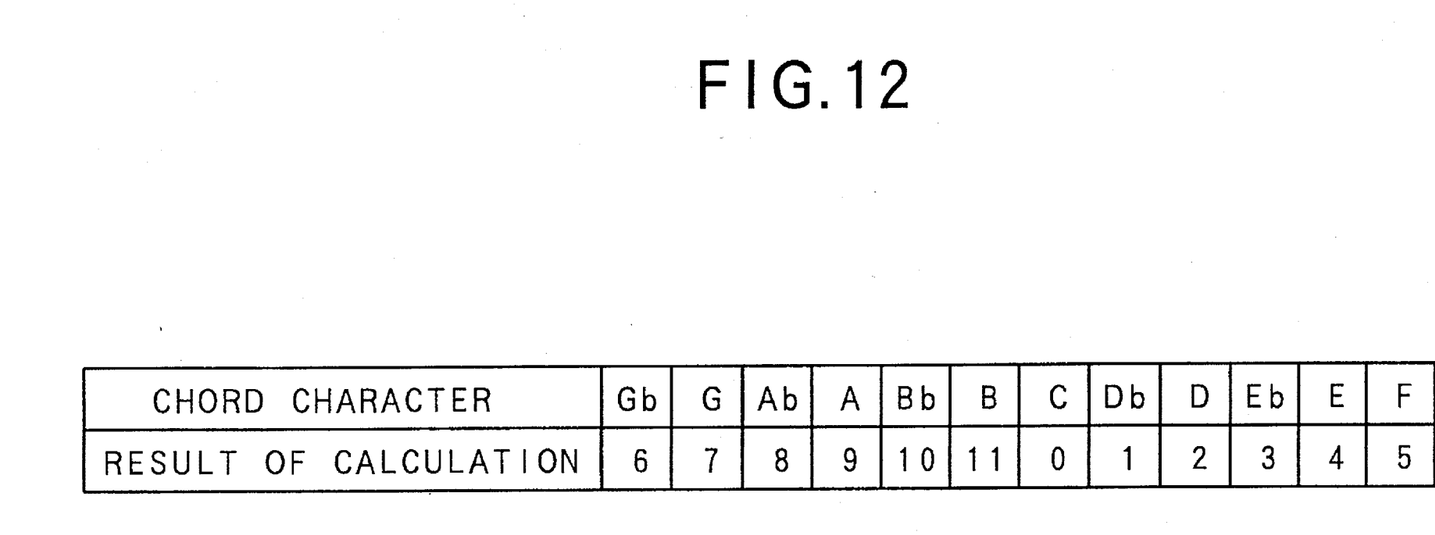
FIG. 12 is a diagram for explaining the chord character and the corresponding mode calculation result in the embodiment.

FIG. 12 shows a graph of the surpluses of the mode calculation and corresponding chord characters.

In the above example, the surplus becomes as following.

33$h$/12=4, with the surplus=3.

Thus, the chord character becomes "E flat".

As a result, the controller 8 displays the chord character= "E flat" on the picture plane (step S34 in FIG. 11).

Nextly, the flow returns to the step S31 in FIG. 11, and the controller 8 performs as following. Namely, since the next 1st byte is the ASCII code corresponding to the character data "m" (NO), and the flow branches to the step S35. Then, since the status data is not "D5h" in the judgement of the step S35, the character "m" corresponding to the ASCII code is displayed at a predetermined position on the picture plane (step S36).

Nextly, the processes of the steps S31 to S36 are performed again, and the character data "7" is displayed in the same manner as the case of the charter data "m".

Successively, the flow returns the step S31. Then, since the next 1 byte is the status data="D5h", the flow branches to a step S37, where the controller 8 performs the next operation.

Figure 13:
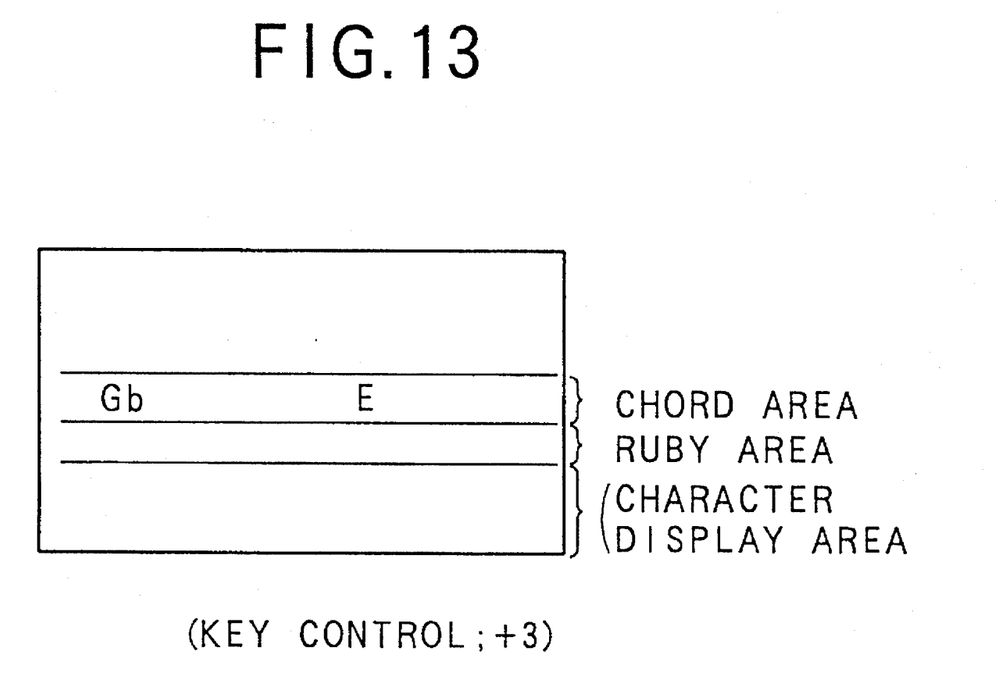
FIG. 13 is a diagram for explaining an example of the display in case there is a key control.

As a result of the above, supposing that the image display before the transposition is the one as shown in FIG. 10, the image display after the transposition (in case that the key control amount data=+3) becomes as shown in FIG. 13, so that the correct accompaniment chord can be displayed.

As described above in detail, according to the first embodiment, the accompaniment chord display controlling device displays the accompaniment chord at the vicinity of the corresponding lyrics on the displayed picture plane on the basis of the accompaniment chord data, and the performance of the instrument can be easily performed while the player is watching the image display in parallel with the reproduction of the accompaniment music of the music accompaniment play. Thus, the participation by the players of the instruments can be easily performed.

According to the second embodiment, the accompaniment chord converting device converts one accompaniment chord data to another accompaniment chord data corresponding to the key (sound tone) after change, on the basis of the key changing data inputted from the external, so that the accompaniment chord displayed on the display picture plane becomes corresponding to the accompaniment music of the music accompaniment play after the transposition. Thus, even if the sound key is changed, the performance of the instrument can be easily performed while the player is watching the image display in parallel with the reproduction of the accompaniment music of the music accompaniment play.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A display controlling apparatus for a music accompaniment playing system, in which MIDI (Music Instrument Digital Interface) sound source controlling data to control a MIDI sound source for generating accompaniment music information for music accompaniment playing, and display controlling data to perform a display corresponding to the MIDI sound source controlling data, are reproduced from a record medium for music accompaniment playing, said display controlling data including lyrics data corresponding to lyrics for music accompaniment playing, and accompaniment chord data corresponding to an accompaniment chord of the accompaniment music information, said apparatus comprising:

a reading means for reading the display controlling data from the record medium; and an accompaniment chord display controlling means for generating data to display the lyrics on a display having a picture plane and to display the accompaniment chord on said picture plane at a vicinity of the displayed lyrics corresponding to the accompaniment chord, on the basis of the accompaniment chord data in the display controlling data read by said reading means.

2. An apparatus according to claim 1, wherein a sound key changing data to change a sound key of the accompaniment music information is inputted to said music accompaniment playing system from the external, and said accompaniment chord display controlling means comprises an accompaniment chord changing means for changing the accompaniment chord data to another accompaniment chord data corresponding to the changed sound key on the basis of the sound key changing data.

3. An apparatus according to claim 1, wherein video image data are inputted into said music accompaniment playing system from the external, and said apparatus further comprises a superimposing circuit for superimposing the lyrics data and the accompaniment chord data onto the video image data.

4. An apparatus according to claim 1, further comprising a reproducing means for reproducing the MIDI sound source controlling data and the display controlling data from the record medium for music accompaniment playing.

5. An apparatus according to claim 4, wherein said record medium for music accompaniment playing comprises an OMD (Optical Memory Disc), and said reproducing means comprises an OMD drive.

6. An apparatus according to claim 1, wherein said apparatus includes the MIDI sound source.

7. An apparatus according to claim 1, further comprising an operation unit for inputting various operation instruction data into said apparatus.

8. A music accompaniment playing system comprising:

a record medium for recording MIDI (Music Instrument Digital Interface) sound source controlling data to control MIDI sound source for generating accompaniment music information for music accompaniment playing, and display controlling data to perform a display corresponding to the MIDI sound source controlling data, said display controlling data including lyrics data corresponding to lyrics for music accompaniment playing, and accompaniment chord data corresponding to an accompaniment chord of the accompaniment music information;

a reproducing means for reproducing the MIDI sound source controlling data and the display controlling data from said record medium; and an accompaniment chord display controlling means for generating data to display the lyrics on a display having a picture plane and to display %he accompaniment chord on said picture plane at a vicinity of the displayed lyrics corresponding to the accompaniment chord, on the basis of accompaniment chord data in the display controlling data reproduced by said reproducing means.

9. A system according to claim 8, further comprising:

an inputting means for inputting a sound key changing data to change a sound key of the accompaniment music information; and an accompaniment chord changing means for changing the accompaniment chord data to another accompaniment chord data corresponding to the changed sound key on the basis of the sound key changing data.

10. A system according to claim 8, further comprising:

a LVD (Laser Video Disc) player for reproducing video image data; and a superimposing circuit for superimposing the lyrics data and the accompaniment chord data onto the video image data.

11. A system according to claim 9, wherein said inputting means comprises a key control switch provided on a microphone connected to said accompaniment chord changing means.

* * * * *